United States Patent
Murphy et al.

(10) Patent No.: US 7,870,734 B2
(45) Date of Patent: Jan. 18, 2011

(54) STEAM DRIVEN TURBINE GENERATOR SYSTEM

(75) Inventors: Timothy J. Murphy, Massapequa, NY (US); Ernest J. Biron, Verona, NJ (US)

(73) Assignee: Carrier Corporation, Farmington, CT (US)

( * ) Notice: Subject to any disclaimer, the term of this patent is extended or adjusted under 35 U.S.C. 154(b) by 745 days.

(21) Appl. No.: 11/816,117

(22) PCT Filed: Feb. 14, 2005

(86) PCT No.: PCT/US2005/004438

§ 371 (c)(1),
(2), (4) Date: Aug. 13, 2007

(87) PCT Pub. No.: WO2006/088442

PCT Pub. Date: Aug. 24, 2006

(65) Prior Publication Data

US 2010/0127498 A1    May 27, 2010

(51) Int. Cl.
*F01K 13/02* (2006.01)
(52) U.S. Cl. .............. 60/646; 60/656; 60/657
(58) Field of Classification Search ... 60/641.8–641.15, 60/646, 656, 657, 670, 661, 662, 663
See application file for complete search history.

(56) References Cited

U.S. PATENT DOCUMENTS

| | | | |
|---|---|---|---|
| 1,969,695 A | 8/1934 | Hendricks, Jr. | |
| 4,316,362 A | 2/1982 | Ninomiya et al. | |
| 4,471,446 A | 9/1984 | Podolsky et al. | |
| 4,576,008 A * | 3/1986 | Silvestri, Jr. ............... | 60/662 |
| 4,598,551 A * | 7/1986 | Dimitroff et al. ............ | 60/646 |
| 5,361,585 A * | 11/1994 | Westphal et al. ............ | 60/646 |
| 5,473,898 A * | 12/1995 | Briesch ..................... | 60/646 |
| 6,354,800 B1 | 3/2002 | Hays | |
| 6,647,727 B2 * | 11/2003 | Klatt et al. .................. | 60/653 |

* cited by examiner

Primary Examiner—Hoang M Nguyen
(74) Attorney, Agent, or Firm—Bachman & LaPointe, P.C.

(57) ABSTRACT

A system for generating electricity from steam power, which includes a steam source communicated with a steam load, the steam load requiring steam at a load pressure lower than the steam source; a pressure reduction valve communicated between the steam source and the steam load, and adapted to reduce steam pressure to the load pressure; and a pressure reduction valve bypass circuit including a steam turbine for converting steam to electric power, the turbine being communicated with an electric power load to provide power to the load. The turbine is advantageously positioned vertically above a motor.

23 Claims, 2 Drawing Sheets

STEAM DRIVEN TURBINE GENERATOR SYSTEM

BACKGROUND OF THE INVENTION

The invention relates to steam turbines and, more particularly, to a system and method using steam turbines to produce electric power from excess steam pressure in a steam powered system.

Steam powered systems such as chillers, heaters, and the like are typically powered using steam at a defined pressure. Also typically, such systems require steam at a lower pressure than the pressure at which the steam is supplied. Under these circumstances, it is known to use pressure regulator valves for the purpose of bleading off excess steam pressure and, thereby, for delivering steam pressure at a desired level. Unfortunately, this leads to wasting of steam pressure.

It is a primary object of the present invention to provide a system and method wherein steam pressure is not wasted.

It is a further object of the invention to provide a system wherein excess steam pressure is used to power electric devices.

It is another object of the invention to provide a system which occupies little floor space.

Other objects and advantages will appear herein below.

BRIEF DESCRIPTION OF THE DRAWINGS

A detailed description of preferred embodiments of the present invention follows with reference to the attached drawings, wherein.

DETAILED DESCRIPTION

The invention relates to steam powered systems and, more particularly, to a system and method for converting excess steam power in such systems to use in generating electric power. This electric power can be used to power related or non-related systems, and results in practical use of such power rather than waste of the power through pressure reducing mechanisms previously used to reduce pressure from the steam source to the pressure required by a steam load.

In the attached drawings, a schematic of the system is provided, and an advantageous vertical arrangement of components of the invention is also shown, whereby the system provides desirable use of excess steam power with a small footprint.

Figure 1:
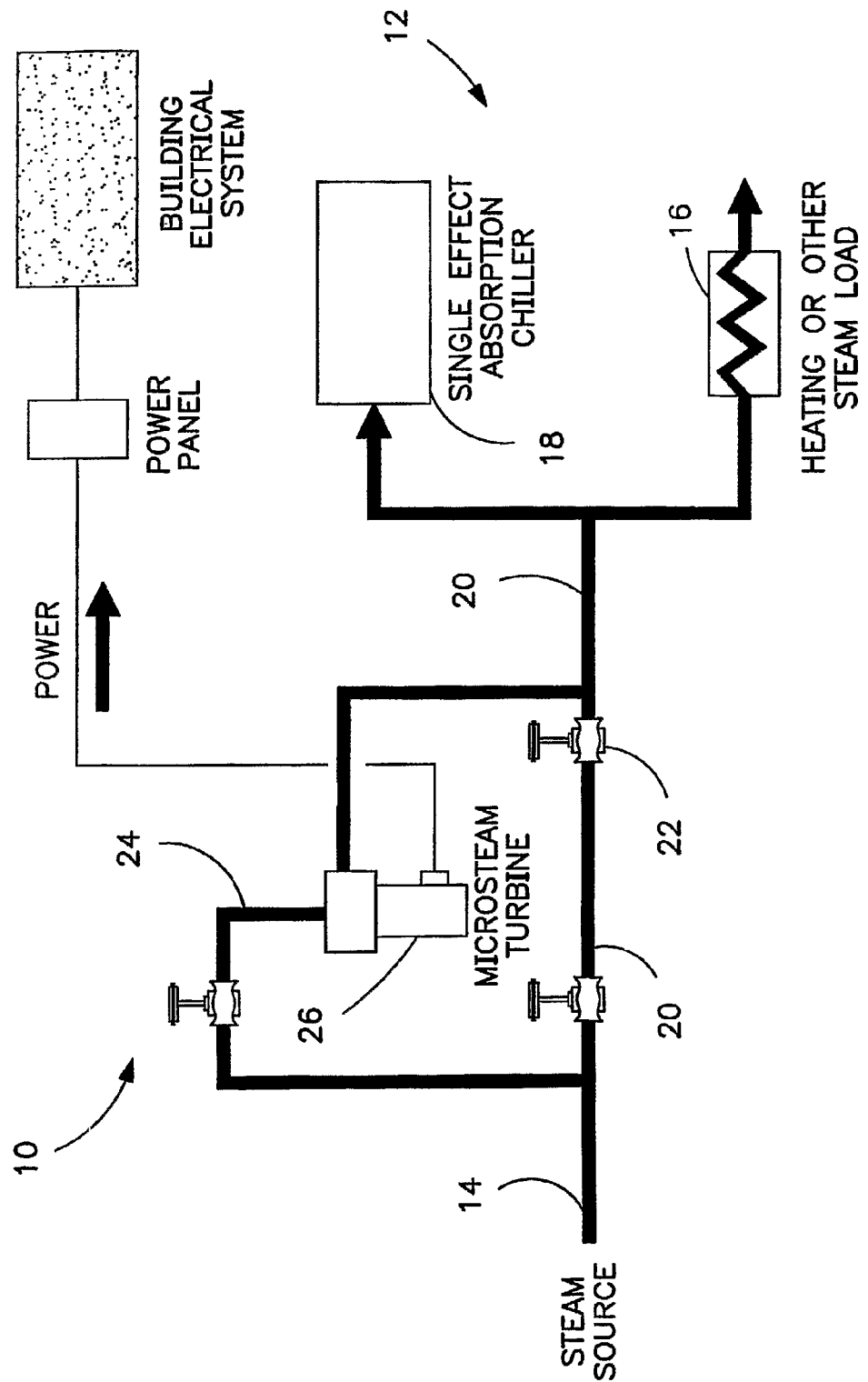
FIG. 1 schematically illustrates a system in accordance with the invention.

FIG. 1 schematically illustrates a system 10 in accordance with the invention, and includes a steam powered system 12 including a steam source 14, and one or more steam operated loads 16, 18, which are communicated through a line 20. Typically, steam can readily be provided at high pressure, usually about 100 psig. Typical components such as absorption chillers, steam heating or other steam loads require steam at a pressure which is much lower, typically about 14 psig or less. Conventionally, an expansion valve 22 is positioned along line 20 and used to reduce the pressure as needed so as to reach the desired level. The pressure so reduced is wasted.

According to the invention, a bypass branch or circuit 24 is provided which flows around, or in parallel to, expansion valve 22. Positioned along bypass branch 24 is a steam turbine 26, which is connected to a motor whereby the turbine drives the motor which generates electric current. In this way, the system of the invention converts steam power which would otherwise be wasted into electric current. According to the invention, the turbine can be used to reduce the pressure of steam as desired, yet also convert the excess steam power to a useful product, that is, electric current which can advantageously be used to power other loads.

According to the invention, turbine 26 can be a single stage turbine such as that disclosed in U.S. Pat. No. 6,354,800, or a two stage turbine and/or a shrouded wheel turbine, or any other type of turbine which may be readily known to a person of ordinary skill in the art. According to the invention, the turbine advantageously has a high efficiency in converting steam power into electric power.

Preferably, a suitable turbine will have a pressure reduction ratio of between about 2 and about 10, and further preferably has an efficiency of at least about 60%.

The steam load can be any steam powered HVAC component such as a heating component, a cooling component, an L.P. absorption unit, absorption chillers, and/or any other component which would be steam powered and, preferably, within the field of endeavor discussed above.

One preferred embodiment of the steam load is a combination of a chiller and/or a heating unit. Another preferred steam load is an L.P. absorption unit.

In one embodiment, a chiller and a heater are both powered by the steam source, and the chiller and heater can advantageously be positioned in a parallel arrangement if desired.

When incorporated into a system for operating HVAC steam-powered components, the steam turbine bypass circuit of the present invention can advantageously be used to provide electric current to electrically powered units as described above, and within the scope of the present invention, so as to provide an advantageous use for what would otherwise be wasted steam energy.

The electric load or component to be powered can be any electrically-operated device, and can, for example, be an electric component which forms a portion of a building electrical system which can be powered through a power panel communicated with the steam turbine for receiving electric current generated thereby.

The turbine can be provided having a nominal rating of at least about 150 kW, more preferably at least about 220 kW.

In one embodiment of the invention, the steam load can take the form of an absorption chiller and the power load can take the form of an electric chiller.

The power load is selected from the group consisting of electric motors, pumps, compressors, fans and combinations thereof.

Figure 2:
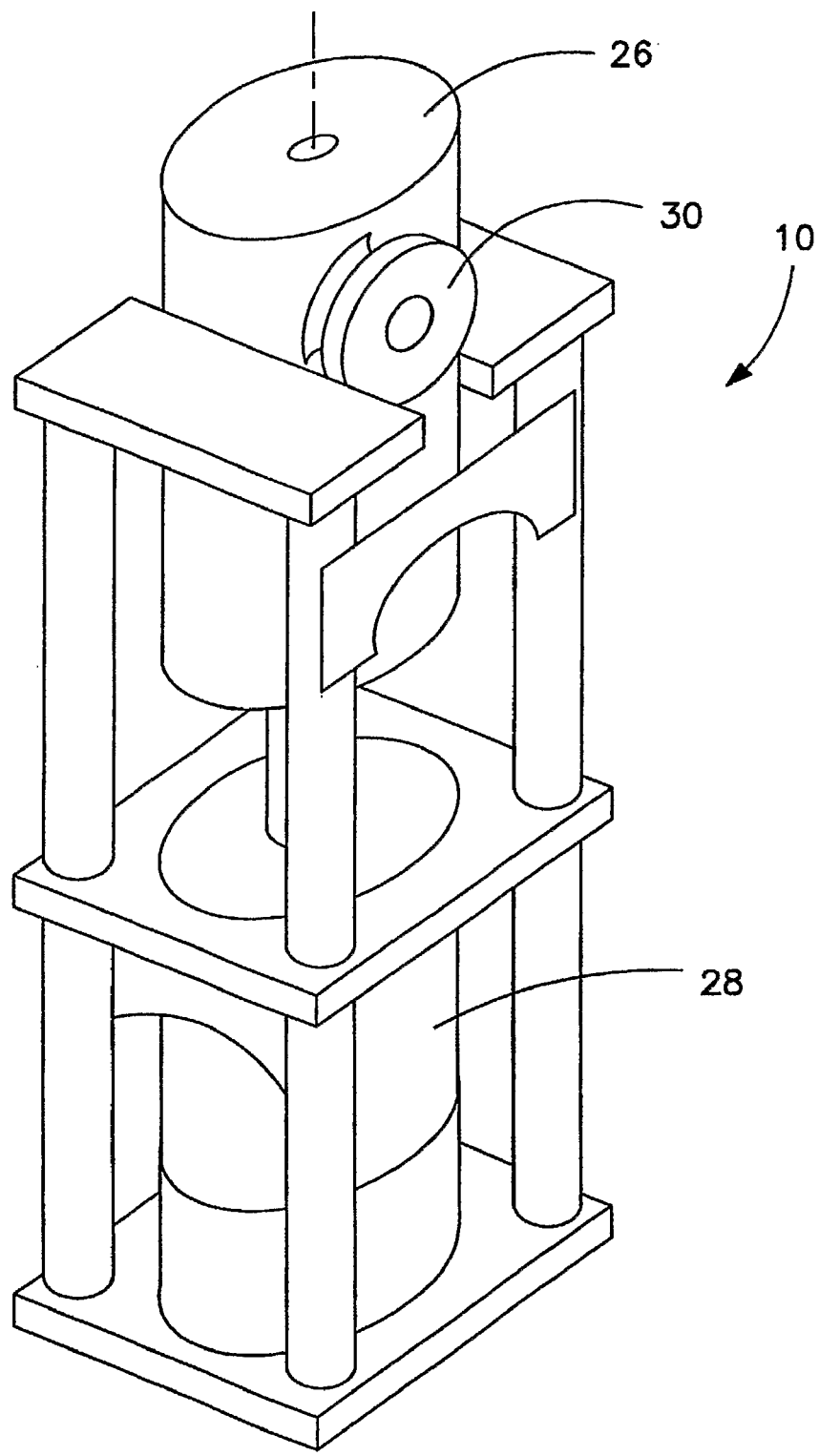
FIG. 2 further illustrates a system according to the invention.

As set forth above, the system of the present invention occupies a relatively small floor space, thereby advantageously providing the desired conversion of steam energy to electric current without occupying potentially in-demand floor space. FIG. 2 illustrates a system 10 according to the invention including turbine 26 which in this embodiment is mounted vertically above a motor 28 as shown. Turbine 26 can be connected to motor 28 through a series of gears whereby rotation of the element of the turbine drives the motor, and the motor thereby generates electric current. As shown in FIG. 2, motor 28 can advantageously be oriented substantially vertically, that is, for rotation of its rotatable element around a substantially vertical axis, with turbine 26 mounted above same and also oriented for rotation of the steam driven element around a substantially vertical axis. Suitable gears can be used to intermesh the drive shaft of the turbine with the driven shaft of the motor. In this regard, FIG. 2 also shows turbine 26 having an inlet 30 which is positioned vertically higher than an outlet of same. It should be readily apparent that this arrangement of turbine and motor allows for conversion of steam energy to electric current as desired while occupying a relatively small floor space.

In this embodiment, the drive shaft of the turbine and driven shaft of the motor can be substantially parallel and either spaced laterally to provide suitable room for meshing gears, or alternatively could be substantially coaxial and joined directly.

It should also be appreciated that the substantially parallel shafts of turbine and motor could be adapted to alternative orientations, that is, other than substantially vertical, within the broad scope of the present invention. This may be desired for example in situations where horizontal floor space is available but a small vertical profile is desired.

A control unit 32 (FIG. 1) can be provided and communicated with an inlet valve to the turbine for controlling the inlet to maintain a desired steam pressure. This control unit can advantageously be programmed or otherwise adapted to utilize as much excess steam energy or pressure as is available to generate electric current as desired. The control unit itself can advantageously be provided in the form of a processor unit such as a desktop computer, on-board processing capability, and the like, and such processing unit can advantageously be programmed utilizing various software routines and other programming which will also be well known to a person of ordinary skill in the art so as to provide the desired outcome of adjusting the outlet pressure from the steam turbine to the desired inlet pressure of steam to the steam-powered components.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A system for generating electricity from steam, comprising:
    a steam source for providing steam at a source pressure, the source being communicated with a steam load which requires steam at a load pressure lower than the source pressure, the steam load comprising a chiller;
    a flow line connected between the steam source and the steam load and having a pressure reduction valve adapted to reduce steam pressure from the source pressure to the load pressure; and
    a pressure reduction valve bypass circuit bypassing the pressure reduction valve and including a steam turbine system operated by steam from the steam source at source pressure for converting a portion of the source pressure to electric power and producing steam at the load pressure, the turbine being communicated to provide power to an electric power load.

2. The system of claim 1, wherein the turbine system comprises a turbine and a motor, the turbine being mounted vertically above the motor and operatively associated with the motor whereby steam drives the turbine and the turbine drives the motor to generate electric current.

3. The system of claim 2, wherein the motor and the turbine each have rotatable elements and wherein the rotatable elements rotate around substantially vertical axes of rotation.

4. The system of claim 2, wherein the turbine is a shrouded wheel turbine.

5. The system of claim 1, wherein the turbine system comprises a two stage turbine.

6. The system of claim 1, wherein the turbine system has a pressure reduction ratio of between about 2 and about 10.

7. The system of claim 1, wherein the turbine system has an efficiency of at least about 60%.

8. The system of claim 1, wherein the steam load comprises a parallel arrangement of said chiller and a heater.

9. The system of claim 1, wherein the turbine system has a nominal rating of at least about 150 kW.

10. The system of claim 1, wherein the turbine system has a nominal rating of at least about 275 kW.

11. The system of claim 1, wherein the chiller is an absorptive chiller and wherein the power load comprises an electric chiller.

12. The system of claim 1, wherein the power load is selected from the group consisting of electric motors, pumps, compressors, fans and combinations thereof 13. The system of claim 1, further comprising a control unit communicated with an inlet valve to the turbine for controlling flow to the inlet to maintain a desired steam pressure.

14. The system of claim 13, wherein the desired steam pressure is the load pressure.

15. A method for generating electric current from steam, comprising the steps of:
    providing a steam load requiring steam at a load pressure, the steam load comprising a chiller;
    communicating the steam load with a source of steam at a pressure higher than the load pressure;
    passing steam from the steam source to the steam load through a pressure reduction valve bypass circuit including a steam turbine system for converting steam to electric current and producing steam at the load pressure, the turbine system being communicated to provide electric current to an electric power load.

16. The method of claim 15, wherein the chiller is an absorptive chiller.

17. The method of claim 15, wherein the steam turbine system comprises a two-stage turbine.

18. The method of claim 15, wherein the steam turbine system has a pressure reduction ratio between about 2 and about 10.

19. The method of claim 15, wherein the turbine system has an efficiency of at least about 60%.

20. The method of claim 15, wherein the turbine system has a nominal rating of at least about 150 kW.

21. The method of claim 15, wherein the turbine system has a nominal rating of at least about 275 kW.

22. The method of claim 15, wherein the electric power load is selected from the group consisting of electric motors, pumps, compressors, fans and combinations thereof.

23. The system of claim 15, wherein the chiller is an absorptive chiller and wherein the power load comprises an electric chiller.

* * * * *